United States Patent [19]

Tatge et al.

[11] 3,763,465
[45] Oct. 2, 1973

[54] BEARING DEVIATION INDICATOR

[75] Inventors: Robert B. Tatge; Richard J. Wells, both of Schenectady, N.Y.

[73] Assignee: The United States of America as represented by the Secretary of the Army.

[22] Filed: Mar. 9, 1971

[21] Appl. No.: 122,511

[52] U.S. Cl............ 340/16 R, 340/6 R, 343/100 CL
[51] Int. Cl............................................. G01s 3/80
[58] Field of Search............. 343/100 CL; 340/6 R, 340/6 S, 16 R

[56] References Cited
UNITED STATES PATENTS
3,154,778  10/1964  Kock .............................. 343/100 CL
3,348,195  10/1967  Spandock.......................... 340/16 R Primary Examiner—Richard A. Farley
Attorney—Harry M. Saragovitz, Edward J. Kelly and Herbert Berl

[57] ABSTRACT

The disclosure describes an improved bearing deviation indicator for detecting and tracking noise sources such as, for example, those produced by vehicles. The device comprises a rotatable acoustic array which generates electrical analogs of the noise waves which are coupled to novel signal processing means which produce signals indicative of alignment of the acoustic array with the noise source or deviation of the acoustic array from the noise source. The signals are coupled to servo means which in response thereto rotates the array to align it with the noise source.

5 Claims, 3 Drawing Figures

Patented Oct. 2, 1973

3,763,465

INVENTORS,
Robert B. Tatge
Richard J. Wells

BY: Harry M. Saragovitz,
Edward J. Kelly &
Herbert Berl        ATTORNEYS.

BEARING DEVIATION INDICATOR

Heretofore bearing deviation indicators employed for locating a noise source have not had the capability of generating an error signal which is very sensitive to angular error. These indicators employed crossed directive acoustic arrays, each formed by a multiplicity of microphones. The error signal is produced by mounting the arrays at an angle with one another, thus effectively crossing their reception beams. The outputs of these arrays are processed by electronic means including amplifiers in such a manner that when the outputs of the processing means are 180° out-of-phase when each array sees acoustic signals of the same phase. However, such bearing deviation indicators which are dependent upon amplifiers do not produce a great rate of change of error signal per degree of angle deviation from the target or noise source.

Accordingly a prime object of the invention is an improved bearing deviation indicator wherein a great rate of change of error signal per degree of angle deviation from the target or noise source is obtained.

The novel features that are considered characteristic of the invention are set forth with particularity in the appended claims. The invention itself, however, both as to its organization and method of operation as well as additional objects and advantages thereof will be understood when read in conjunction with the accompanying drawing in which:

Figure 1:
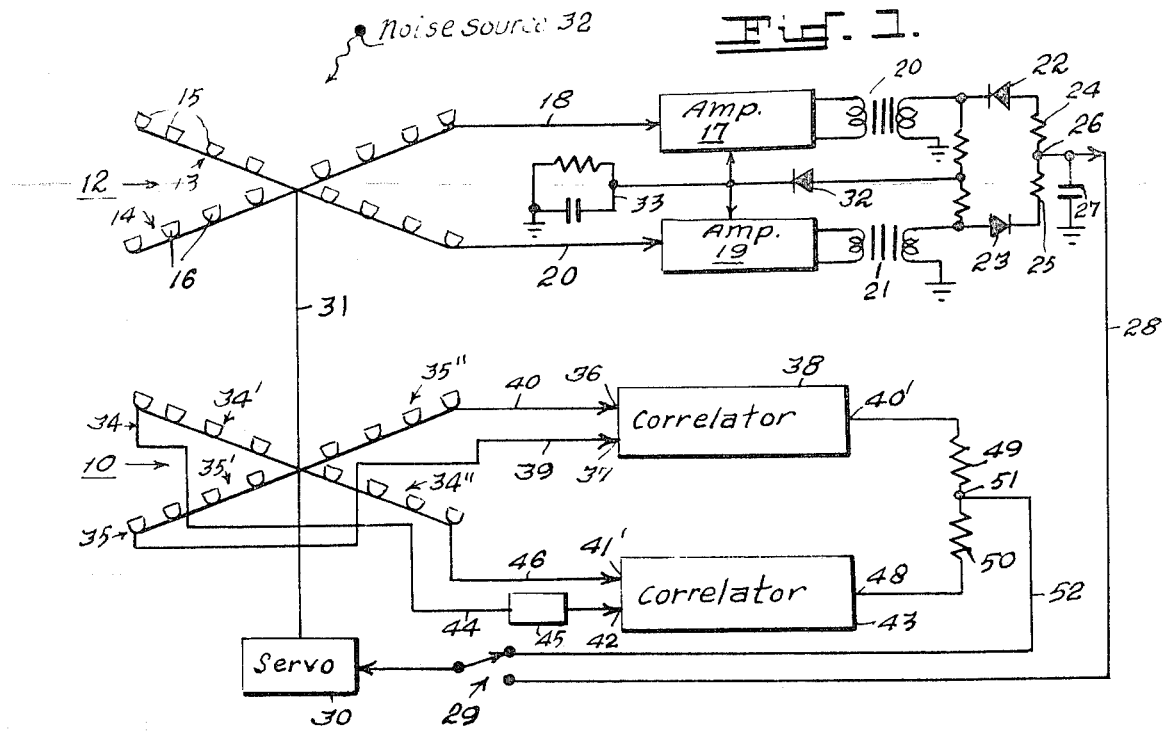
FIG. 1 is a schematic representation of the invention.

Referring now to FIG. 1, reference numeral 10 indicates the improved bearing deviation indicator which is designed to be used after target, noise source, has been acquired and roughly trained thereon by other means such as a conventional bearing deviation indicator means 12 which does not generate an error signal very sensitive to angular error. In one embodiment of the bearing deviation indicator 12, two directive acoustic arrays 13 and 14 are employed, each consisting of eight longitudinally spaced connected microphones 15 and 16, respectively. The error signal is produced by mounting the arrays 13 and 14 at an angle to each other with an equal number of microphones being disposed on each side of each array at the point of intersection of the arrays, thus effectively crossing their receiving beams. The output of array 14 is coupled to the input of an electronic amplifier 17 as indicated by 18 and the output of array 13 is coupled to electronic amplifier 19 as indicated by 20. The outputs of amplifiers 17 and 19 are connected to transformers 20 and 21 to rectifying diodes 22 and 23 which have their outputs bridged by summing means comprising series connected resistors 24 and 25. The summing point 26 is coupled to an integrating capacitor 27 which in turn is connected by conductor means 28 through switch means 29 to servo means 30 which is coupled to a vertical mast 31 for the purpose of rotating array 12 which is mounted thereon. An AGC circuit coupled to the outputs of amplifiers 17 and 19 and consisting of series connected diode rectifier 32 and parallel resistor capacitor 33 provides means whereby the sum of the outputs of said amplifiers, amplified signals, is rectified and applied as an AGC to the amplifiers so that the sum signal is held constant in level. The crossed arrays 13 and 14 outputs are amplified by amplifiers 17 and 19, respectively, then rectified by rectifiers 22 and 23 such that the outputs of the rectifiers are 180° out-of-phase when each array sees signals of the same phase. When the crossed array is trained in response to the integrated output in view of the deviation of the array from the noise source 32 through servo means 30 to a point where its axis points directly to noise source 32, the rectified signals exactly balance out giving a net output of zero. When the crossed array deviates or is deviated from noise source 32, the sum of the rectified signals will swing positive or negative depending on the direction of the error, that is, the degree that the crossed array is pointed away from either side of the noise source. Of course it is to be understood that the foregoing describes but one means which may be employed for acquiring the noise target and roughly training the array 10 utilized in the invention.

The improved bearing deviation indicator 10 uses polarity-coincidence correlators in combination with an acoustic array, subsequently described, to achieve bearing error information and means responsive thereto whereby the array tracks and pinpoints the noise source. In a preferred embodiment the acoustic array employed in the invention comprises two crossed microphone arrays 34 and 35 having the same number of microphones as the arrays of conventional bearing deviation indicator 12, but now each array is connected as two multi-element microphone arrays 34' and 34'', and 35' and 35'', each shaded for optimum side-lobe suppression, that is, the microphones of each array are connected in a manner so as to form a narrow receptive beam wherein the sensitivity of adjacent microphones decreases from the center of the array to the extremity thereof. Crossed arrays 34 and 35 are mounted at their intersection on the shaft 31 below the crossed arrays 13 and 14 in acoustical alignment therewith. Each array thus arranged is directive and discriminates against noise sources outside of the acceptance angle of the complete array. The outputs of arrays 35' and 35'' of array 35 are coupled to a first input 36 and a second input 37 of a correlator 38 as indicated by 39 and 40, respectively, whereby the A.C. outputs of the microphones of these arrays generated in response to the noise source are applied to inputs 36 and 37 and processed by a polarity-coincidence correlator 38 to produce a positive going signal at the output 40' thereof. The output of array 34' of array 34 is coupled as indicated by 44 through a 180° phase reversal means 45 to a second input 42 of a polarity-coincidence correlator 43 and the output of array 34'' thereof as indicated by 46 is directly coupled to a first input 41 of correlator 43 whereby the A.C. outputs of the microphones of these arrays generated in response to the noise source are applied out of phase to the inputs of correlator 43 which processes these out of phase inputs to produce a negative going signal at its output. Thus it can be seen that an error signal is generated since the output of correlator 38 is arranged to be a plus value for perfect correlation while the output of correlator 43 is made to be a minus value and that the sum of the correlator outputs will swing positive or negative as the crossed acoustic arrays swing from one side of the noise source to the other. The sum of the outputs of correlators 38 and 43 is obtained by summing means consisting of series connected resistors 49 and 50 bridged between the outputs of polarity-coincidence correlators 38 and 43 with the intermediate junction 51 being the summing point which is coupled by conductor means 52 through switch means 29 to servo means 30 which in response to the summed error signals of the polarity-coincidence correlators 38 and 43 rotates shaft 31 whereby the center of the crossed acoustic array comprising longitudinally disposed microphone arrays 34 and 35 is brought into alignment with the noise source 32.

Figure 2:
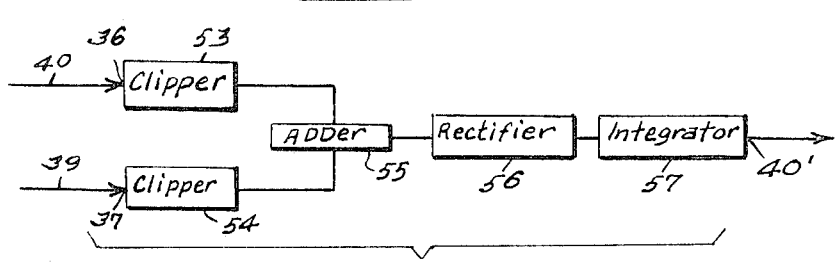
FIG. 2 is a block diagram of a correlator.

The polarity-coincidence correlators 38 and 39 may each consist of the arrangement shown in the block diagram of FIG. 2. Infinite clipper 53, for example, has coupled to its input 36 the output signals of microphone array 35'' and infinite clipper 54 has coupled to its input 37 the output signal of microphone array 35' whereby each input signal is infinitely and symmetrically clipped, reducing each signal to a rectangular wave having the same zero crossings as the original signals. These two clipped signals are then added by means of adder 55 coupled thereto, the output of which is full-wave rectified by full-wave rectifier 56 and the result integrated by integrator 57 which provides a positive going output signal to which servo means 30 responds. Similarly, the output signals of microphone arrays 34' and 34'' are processed by identical correlator 43 with the exception that a phase reversal means is coupled between one of the said array outputs and an input of the correlator resulting in a negative going error signal being obtained at the output 48 of correlator 43.

Figure 3:
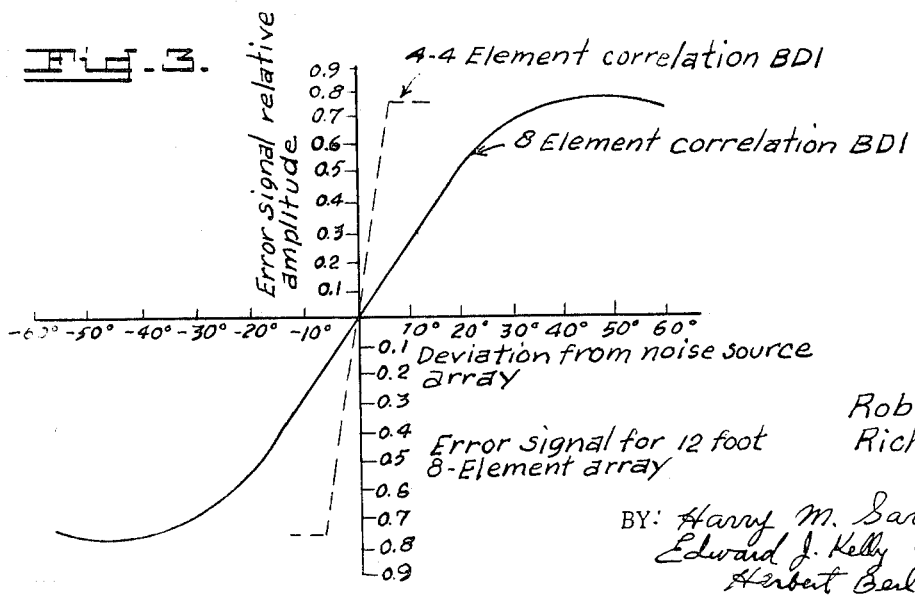
FIG. 3 is a graph illustrating the great rate of change of error signal per degree of angle deviation from the target.

In FIG. 3 the solid curve represents the calculated error signal for a conventional bearing deviation indicator, described in conjunction with FIG. 1, and as can be ascertained from examination thereof the rate of change of error signal per degree of deviation is very small. From the dash curve representing the calculated error signal of the invention it can be seen that once the inventive device acquires the target, the rate of change of error signal per degree of deviation is very great thus the inventive device results in quickly and accurately pinpointing the target or noise source.

We claim:

1. A bearing deviation indicator for tracking and pinpointing a noise source and having a great rate of change of error signal per degree of angle deviation from the noise source comprising in combination:

first and second longitudinally disposed electroacoustical directive arrays crossed at their centers whereby their effective receptive paths are crossed;

said first directive array comprising a first group of connected spaced microphones extending outwardly of the center of the array and a second group of connected spaced microphones extending outwardly of the center of the array diametrically opposite to said first group of microphones;

said second directive array comprising a third group of connected spaced microphones extending outwardly of the center of the array and a fourth group of connected spaced microphones extending outwardly of the center of the array diametrically opposite to said third group of microphones;

a first polarity-coincidence correlator having one input coupled to said first group of microphones and another input coupled to said second group of microphones for processing the electrical analog signals produced by said first and second groups of microphones in response to said noise source with respect to deviation of said first array from said noise source whereby a positive going signal is produced in the output thereof;

a second polarity-coincidence correlator having one input coupled to said third group of microphones and another input coupled to said fourth group of microphones through phase shift means for processing the electrical analog signals produced by said third and fourth groups of microphones in response to said noise source with respect to the deviation of said second array from said noise source whereby a negative going signal is produced in the output thereof;

summing means bridged acrossed the outputs of said first and second polarity-coincidence correlators producing error signals in response to said output signals; and means responsive to said error signals coupled to said directive arrays whereby said directive arrays are subsequently aligned with the noise source.

2. The invention in accordance with claim 1 wherein the microphones of each said array are shaped for optimum side-lobe suppression.

3. The invention in accordance with claim 2 wherein said summing means comprises first and second series connected resistors forming a summing point at their junction and bridged across the outputs of said first and second polarity-coincidence correlators.

4. The invention in accordance with claim 3 wherein said phase shift means comprises a 180° phase shift means.

5. The invention in accordance with claim 4 wherein said means responsive to said error signals comprises servo means adapted to orient said directive arrays in response to the error signals.

* * * * *